Patented July 23, 1929.

1,722,202

UNITED STATES PATENT OFFICE.

MAURICE CUSIN, OF DECINES, AND PIERRE ALPHONSE ANDRÉ CHEVALET, OF LUX, FRANCE; SAID CUSIN ASSIGNOR TO SOCIETE LYONNAISE DE SOIE ARTIFICIELLE, OF LYON, FRANCE, A FRENCH COMPANY.

MANUFACTURE OF CELLULOSE PRODUCTS.

No Drawing. Application filed January 7, 1927, Serial No. 159,738, and in France February 22, 1926.

It is known that the acetates of cellulose can be utilized to produce plastic substances of great value but costly; on the other hand, the cellulose formates obtained hitherto are much less costly but their plastic properties are inferior, they are unstable and have not been put to industrial application.

By the process forming the object of the present invention there may be obtained, in a simple and economical manner, a stable product having all the plastic qualities of cellulose acetate and which is constituted by a hydrocellulose partially esterified by formic and acetic acids.

The manufacture of this partially esterified hydrocellulose involves successive and distinct treatments:

1. Preliminary transformation, at low temperature, of the cellulose into a modified cellulose slightly depolymerized by a mixture of formic acid and sulphuric acid in determined proportions.

2. The product obtained by this first operation is then treated, also at low temperature, with a mixture of crystallizable acetic acid and sulphuric acid in determined proportions.

The mass gelatinizes while forming a transparent paste; and this paste, precipitated in water or in pure or diluted alcohol, gives, after washing and drying, the cellulosic product specified.

The said product has an appearance similar to that of cellulose acetate and has the following particular properties:

It is soluble in formic acid, pure or diluted up to 40%, and forms stable solutions therein;

It is also soluble in certain solvents, such as formaldehyde, its polymers and derivatives; pyridine and ureas; sulfocyanides, cyanates; alkali metal and alkali earth metal nitrates; chloride of calcium.

By way of example, the following proportions and methods of operation are given:

The cellulose (cotton, wood pulp or other cellulose) is dried, then immersed in the following cooled mixture (temperature 10 to 20° C.):

|   | Cubic centimeters. |
|---|---|
| 80% formic acid | 50 to 60 |
| Sulphuric acid at 66° Beaumé | 5 to 7 |

This mixture is for 15 to 20 grams of cellulose according to its physical state. It is mixed for about an hour and the surplus acid mixture may be squeezed out.

The following mixture, cooled to 15 or 20° C., is then added:

|   | Cubic centimeters. |
|---|---|
| Crystallizable acetic acid | 16 to 20 |
| Sulphuric acid at 66° Beaumé | 20 to 25 |

It is mixed until, on taking samples, the completion of the reaction is shown. The operation lasts from four to six hours. The mass is then precipitated in water or alcohol in thin streams. The precipitate obtained is washed until neutralization, then it is dried, and constitutes the cellulosic product specified.

This product is utilizable for the manufacture of artificial textile or plastic substances, either by evaporation in air of a solution thereof in formic acid to obtain various articles such as films, sheets, plates and the like which are perfectly transparent, stable and of great resistance to water; or by the coagulation in water or in pure or diluted alcohol of this same solution for the production of threads, filaments or films which easily take the usual dyes.

The strength of thin threads, filaments or films may be considerably increased by soaking them in a 10% bath of carbonate of ammonia, for example. Preservation is of long duration without alteration.

It is to be noted that the proportions, as well as the duration and the temperature mentioned in the above description, are simple indications and are capable of being varied within certain limits without, by so doing, affecting the principle of the process described. In particular, it must be mentioned that according to the cellulose employed and the quality to be obtained of the final product, the quantity of formic acid can be reduced to a considerable extent.

We claim as our invention:—

1. A process of making cellulose products, comprising the steps of treating cellulose first with a mixture of formic and sulphuric acids, and then with a mixture of acetic and sulphuric acids.

2. A process of making cellulose products, comprising the steps of treating cellulose first with a mixture of formic and sulphuric acids, with the sulphuric acid in small proportion therein, and then with a mixture of acetic and sulphuric acids, with the sulphuric acid in large proportion.

3. A process, according to claim 2, in which both treatments are carried out in the cold.

4. A process of making cellulose products, comprising the steps of treating a mass of 15-20 grams of cellulose with a mixture of 50-60 cubic centimeters of 80% formic acid and 5-7 cubic centimeters of concentrated sulphuric acid; and then treating the resultant product with a mixture of 16-20 cubic centimeters of acetic acid and 20-25 cubic centimeters of concentrated sulphuric acid.

5. A process of making cellulose products, comprising the steps of treating a mass of 15-20 grams of cellulose with a mixture of 50-60 cubic centimeters of 80% formic acid and 5-7 cubic centimeters of concentrated sulphuric acid; and then treating the resultant product with a mixture of 16-20 cubic centimeters of acetic acid and 20-25 cubic centimeters of concentrated sulphuric acid, both treatments being carried out in the cold.

6. A process of making cellulose products, comprising the steps of treating cellulose first with a mixture of formic and sulphuric acids, with the sulphuric acid in small proportion therein, and then with a mixture of acetic and sulphuric acids, with the sulphuric acid in large proportion, thereby forming a gelatinous paste; and then precipitating the mass in thin streams in a precipitant.

In testimony whereof we affix our signatures.

MAURICE CUSIN.
PIERRE APLHONSE ANDRÉ CHEVALET,